(12) United States Patent
Bianchi

(10) Patent No.: US 6,804,934 B1
(45) Date of Patent: Oct. 19, 2004

(54) METHOD FOR PACKAGING DISPOSABLE ARTICLES FOR PARTIES, APPARATUS FOR CARRYING OUT THIS METHOD AND FINAL PACKAGE OBTAINED

(75) Inventor: Marco Bianchi, Massarosa (IT)

(73) Assignee: Fernanda Bianchi (IT)

( * ) Notice: Subject to any disclaimer, the term of this patent is extended or adjusted under 35 U.S.C. 154(b) by 0 days.

(21) Appl. No.: 09/958,772

(22) PCT Filed: Apr. 10, 2000

(86) PCT No.: PCT/EP00/03190
§ 371 (c)(1),
(2), (4) Date: Oct. 9, 2001

(87) PCT Pub. No.: WO00/61476
PCT Pub. Date: Oct. 19, 2000

(30) Foreign Application Priority Data
Apr. 8, 1999 (IT) .......................... P199/00019

(51) Int. Cl.[7] .............................. B65B 5/00
(52) U.S. Cl. .......................... 53/411; 53/540
(58) Field of Search ................. 198/434, 435, 198/438; 53/411, 447, 131.2, 540, 541

(56) References Cited
U.S. PATENT DOCUMENTS

| | | | |
|---|---|---|---|
| 3,759,303 A | * | 9/1973 | Henrichs et al. ............ 141/1 |
| 3,834,522 A | | 9/1974 | Jackson ...................... 198/210 |
| 4,343,391 A | | 8/1982 | Skrypek et al. ............. 198/438 |
| 4,368,665 A | * | 1/1983 | Boyle ....................... 101/93.01 |
| 4,805,758 A | | 2/1989 | Dominico et al. .......... 198/444 |
| 5,191,979 A | * | 3/1993 | Nemeroff ................. 206/459.5 |
| 5,301,802 A | * | 4/1994 | Nemeroff ................... 206/217 |
| 5,385,438 A | * | 1/1995 | Fadaie ....................... 414/810 |

* cited by examiner

Primary Examiner—Jacob K. Ackun, Jr.
(74) Attorney, Agent, or Firm—The Bilicki Law Firm, P.C.

(57) ABSTRACT

A method to make packages of objects for celebrations or parties, such as paper cups, plates, cutlery, and napkins with graphical of figurative elements, i.e., identifying indicia, different from one another, an apparatus that carries out this method, and a package resulting therefrom. The method comprises the steps of: printing or applying on each object (10*a*) a first plurality of a first graphical or figurative element (11*a*); repeating the printing or applying step for further pluralities of equal objects (10*b*, 10*c*) with a second graphical or figurative element (11*b*) for a second plurality (10*b*), with a third graphical or figurative element (11*c*) for a third plurality (10*c*), etc.; creating stacked groups of objects picked up one at a time from each plurality of equal object, whereby each unit comprises only one of said objects of each plurality (10*a* or 10*b* or 10*c*); and packaging the stacked groups (30). The step of stacking the different pluralities of objects with different identifying indicia can be carried out in different feeding means (20*a*, 20*b*, 20*c*), and it is possible that groups of objects (30) are picked up one at a time at the passage under the feeding means.

13 Claims, 5 Drawing Sheets

METHOD FOR PACKAGING DISPOSABLE ARTICLES FOR PARTIES, APPARATUS FOR CARRYING OUT THIS METHOD AND FINAL PACKAGE OBTAINED

CROSS-REFERENCE TO RELATED APPLICATIONS

This applications claims the benefit of and priority to Italian application, serial number ITPI99A/000019, filed Apr. 8, 1999, incorporated herein in its entirety.

1 Field of Invention

The present invention relates generally to a method for packaging articles for parties. The present invention relates specifically to a method for creating non-homogonous articles for parties, such as disposable paper cups, plates, cutlery, and napkins, an apparatus that carries out this method, and to packages of articles obtained with the this method.

2 Description of the Prior Art

For organizing celebrations or parties with a buffet of food and drinks, of disposable paper cups, plates, cutlery in paper or plastic, and napkins, in various shapes and fancy patterns are currently available in the marketplace. The paper cups, places, cutlery, or napkins of every package or normally all identical to one another, and are provided to the attendees for use in eating in drinking. In some cases, the paper cups, plates, cutlery or napkins are used for multiple drinks or snacks, or the participants place the drink or snack aside with the intention of returning to the drink or snack at a later time. In some instances the participants do not remember which cup, plate, cutlery, or napkin is theirs. The participants often then leave the objects and pick up new ones.

This is one of the reasons why during celebrations are parties there is a large and wasteful consumption of paper cups, plates, cutlery, and napkins, often resulting in an exhaustion of the party articles owing to insufficient amount for all the participants, as well as additional work for people serving or for disposing of the used objects.

SUMMARY OF THE INVENTION

It is an object of the present invention to provide a package of objects such as disposable paper cups, plates, cutlery in paper or plastic, and napkins, so that they can be used by every participant for a party without confusion with those used by other participants.

It is another object of the present invention to provide a method that, in addition to a manual method, allows a partial or complete automatic operation for creating a package of such objects.

It is another object of the present invention to provide an apparatus for packaging said articles in an automatic or semi-automatic way with high precision and production rates.

According to a first aspect of the present invention, a method for packaging disposable articles for parties, such as paper cups, plates, cutlery, and napkins and the like, with graphical or figurative elements different from one another, comprises the steps of:

in a first plurality of equal objects, printing or applying a first graphical or figurative element on each object;

repeating the printing step or application step for further pluralities of equal objects, with a second graphical or figurative element for a second plurality, with a third graphical or figurative element for a third plurality, etc.;

creating a stacked group of objects picked up one at a time from each plurality of equal objects, whereby each unit comprises only one of the objects of each plurality and consequently one of each graphical or figurative element; and packaging the stacked group.

In one embodiment, further steps are provided of:

accumulating the different pluralities of objects with different graphical or figurative elements in different feeding means;

creating output stacked groups by picking up the objects one at a time by passing them under feeding means; and packaging each group.

According to another aspect of the invention, the instant invention is an apparatus for making packages of objects, each object having a different graphical or figurative element comprising:

at least a plurality of feeing means arranged along a line or a curve in each of which a stack of objects is present, each object having same graphical or figurative element;

at least one support associated with the plurality of feeding means, the support being movable relatively to the plurality of feeding means, and having a housing suitable for receiving the objects from the feeding means;

means for selectively transferring one object at a time from each feeding means to an output stack of mixed objects formed in the housing, whereby each output stack is formed from objects coming from different feeding means such that each object within the output stack has a different graphical or figurative element, i.e., identifying indicia.

In a fist embodiment, the feeding means are arranged in one or more circular lines on a first platform, the moveable support being arranged on a second platform provided coaxially under the first platform, and having a plurality of housings arranged on a circular line under the feeding means, the relative motion between the platform about the common axis aligning in succession each feeding means and the housings, the means for transferring or selectively releasing one object at a time to an output stack formed in the housing at the point at which the stack is under the feeding means, and providing means for removing the output stack from the housing after passage under a predetermined number of feeding means, i.e., when a predetermined number of objects are placed in a stack.

Alternatively, in a second embodiment, the feeding means are arranged in at least one line, the movable support being a conveyor arranged under the line or lines, the means for selectively releasing one object at a time on to output stack formed on the conveyor when the stack passes under the feeding means.

Preferably, in the first or second embodiments, the feeding means are arranged according to a plurality of concentric or parallel lines whereby a plurality of partial output stacks are formed on each line, and means are provided for combining the partial output stacks, so that a single final package is formed each with different objects.

In the first embodiment, the feeding means that are arranged in one or more circular lines of the first platform are spaced angularly, the second platform having housings angularly spaced like the first platform. Means are provided for rotating stepwise the second platform with respect to the first platform. At each step, the transferring means releases the objects from the feeding means in the housing present under It.

In both embodiments, the transferring means are associated with sensing means that detect the correspondence of the feeding means and the housing. The transferring means releases the objects in response to the sensing means which detect the presence of the feeding means.

In the first embodiment, discharge means may be provided of the output stacks comprising a third platform under the second platform, the second platform having the housings that have the lower end an opening so that the output stacks rest and slide on to the third platform. At least one hole is provided for the one or more circular lines of housings, whereby the output stack in turn passes through the hole and on to withdrawing means.

According to a third aspect of the invention a package of disposable party objects such as paper cups, plates, cutlery, and napkins, is provided comprising a homogenous plurality of the objects, each with a different graphical or figurative element from the other.

BRIEF DESCRIPTION OF THE DRAWINGS

Further characteristics and/or advantages of the present invention will be made clear with the following description of some its embodiments, exemplifying but not intended to be limiting, with reference to attached drawings wherein.

DESCRIPTION OF EMBODIMENTS OF THE INVENTION

Figure 1:
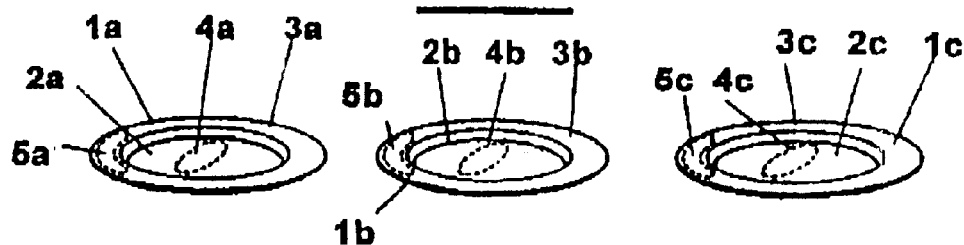
FIG. 1 shows a perspective view of several plates made with the method according to the invention.

With reference to FIG. 1, plate $1a$, which can be a soup, plain, or dessert plate, comprises a is comprised of rim $2a$ and bottom $3a$. On firm $2a$ and/or on bottom $3a$ scripts, drawings, numbers, or other identifying indicia as indicated by numerals $4a$ and/or $5a$ suitable for identifying the article. Similarly, plates $1b$ and $1c$ have similar identifying indicia $4b$ and/or $5b$ and $4c$ and/or $5c$, respectively, but different from $4a$ and/or $5a$. For example, if plate $1a$ has on bottom $4a$ letter A, plate $1b$ has on bottom $4b$ letter B, plate $1c$ has on bottom $4c$ letter C, and so on.

The same concept can be followed for more complex identifying indicia. For example, phrases, proverbs, pieces of poetry, fancy names, as well as drawings or characters of cartoons or famous people, or fancy patterns of different colours or different colour tones can all be used as identifying indicia $4a$, $5a$, $4b$, $5b$, $4c$, and $5c$.

Therefore, in a package of 10, 20, 50, or more plates, each plate $1a$, $1b$, $1c$, etc. has a different identifying indicia $4a$, $5a$, $4b$, $5b$, $4c$, $5c$, etc.

Figure 2:
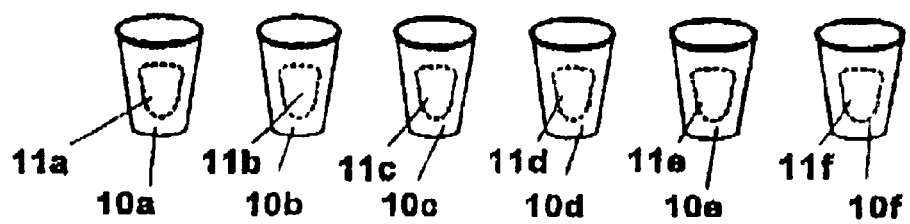
FIG. 2 shows a perspective view of several paper cups made with the method according to the invention.
Figure 3:
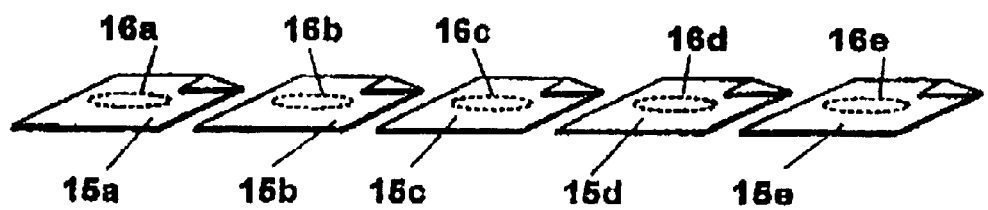
FIG. 3 shows a perspective view of several napkins made with the method according to the invention.

With reference to FIG. 2, a similar case is that of glasses or paper cups $10a$, $10b$, and $10c$. Identifying indicia—$11a$, $11b$, and $11c$ are placed on the respective side surfaces with each identifying indicia $11a$, $11b$, and $11c$ being different from on another. Similarly, as shown in FIG. 3, napkins $15a$, $15b$, $15c$, $15d$, and $15e$ each have identifying indicia $16a$, $16b$, $16c$, $16d$, and $16e$, respectively, with each identifying indicia $16a$–$16e$ being different from one another.

Therefore, users that wish to arrange a celebration or a party can use these packages or party articles with a plurality of paper cups, plates, napkins, cutlery, etc. with each party article different from one another.

In a first embodiment of the invention, the stacking and packaging steps can be carried out in a completely manual way, picking up of the different party articles from different stacks. An automatic or semiautomatic packaging is, however, preferred for industrial production.

Figure 4:
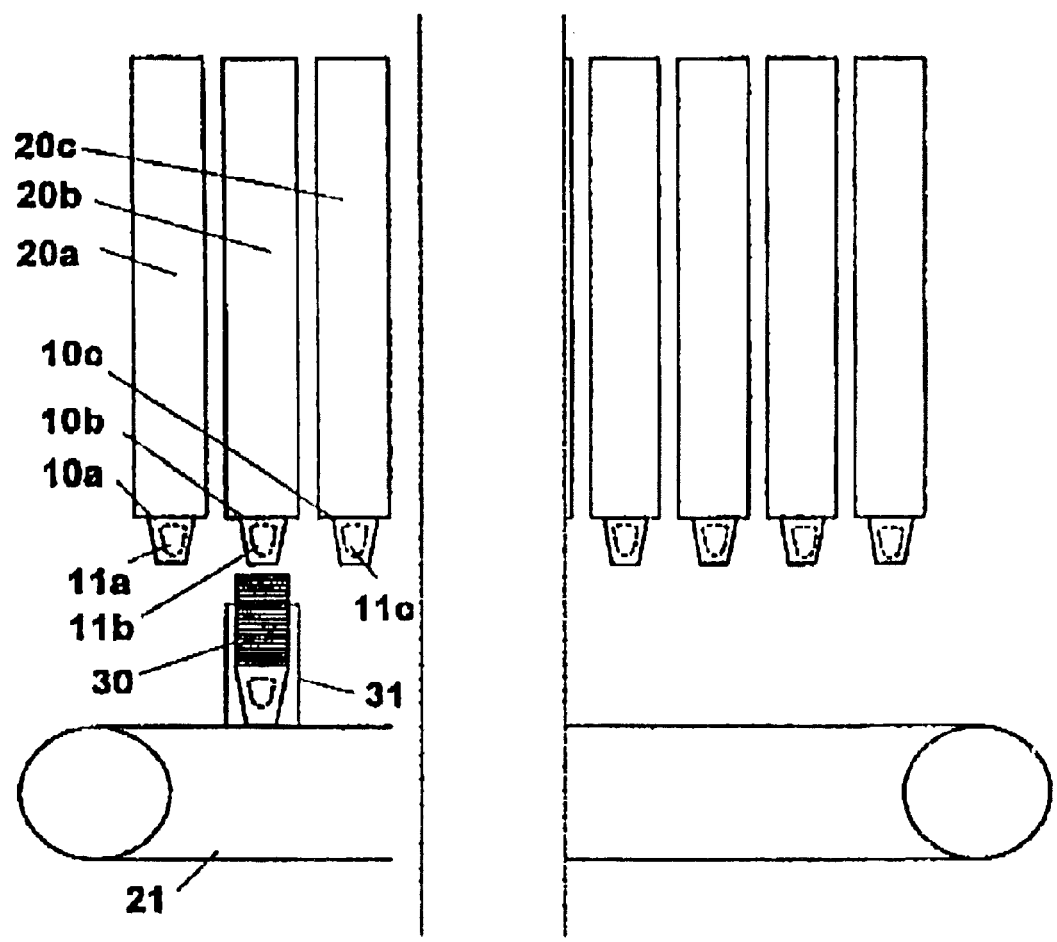
FIG. 4 shows a side perspective view of a first embodiment of a stacking apparatus that carries out the method according to the invention with structure on a line.

With reference FIG. 4, a method for making such packages of party articles, each of which with a different identifying indicia, according to the present invention, comprises the steps of:

in a plurality of equal objects $10a$, for example paper cups, printing or applying one identifying indicia $11a$ on each object $10a$, the identifying indicia being a graphical or figurative element;

repeating the printing or applying step for a further plurality of equal objects $10b$ another identifying indicia $11b$, and for a further plurality of equal objects $10c$ with another identifying indicia $11c$ for as many objects as are to be included in the package;

stacking the different pluralities of equal objects $10a$, $10b$, and $10c$ in different feeding means $20a$, $20b$, and $20c$, aligned above conveyor 21 or equivalent means;

creating stacks 30 of stacked objects picked up on at a time the passage under the feeding means, whereby each stack 30 is comprised of only one of each object $10a$, $10b$, $10c$, etc. for as many objects as are to be included in stack 30; and packaging each stack 30.

This process can be carried out be the apparatus of FIG. 4 both manually or automatedly. For example, the apparatus of FIG. 4 can comprise a pallet 31, or equivalent contained, that, as pallet 31 passes on conveyor 21 and under each distributor $20a$, $20b$, $20c$, objects $10a$, $10b$, and $10c$ are released one at a time. The means for automatically releasing can be operated by optical sensors or abutments that hit pallet 31.

Alternatively, the feeding means may have means for manual release. For example, levers are operated by an operator after each pallet 31 is moved in turn under each feeder $20a$, $20b$, $20c$ for forming stack 30.

Feeding means $20a$, $20b$, $20c$, are sufficient in number to hold and distribute objects $10a$, $10b$, and $10c$ of the same shape but of different and distinguishable identifying indicia $11a$, $11b$, and $11c$. For example, means for feeding stacks 30 of 10, 20, 50 or 100 objects $10a$, $10b$, and $10c$ can be provided.

At the end of conveyor 21, which can be a conveyor belt or a chain, as non-limiting examples (not shown), unloading and packaging means are provided.

Figure 5:
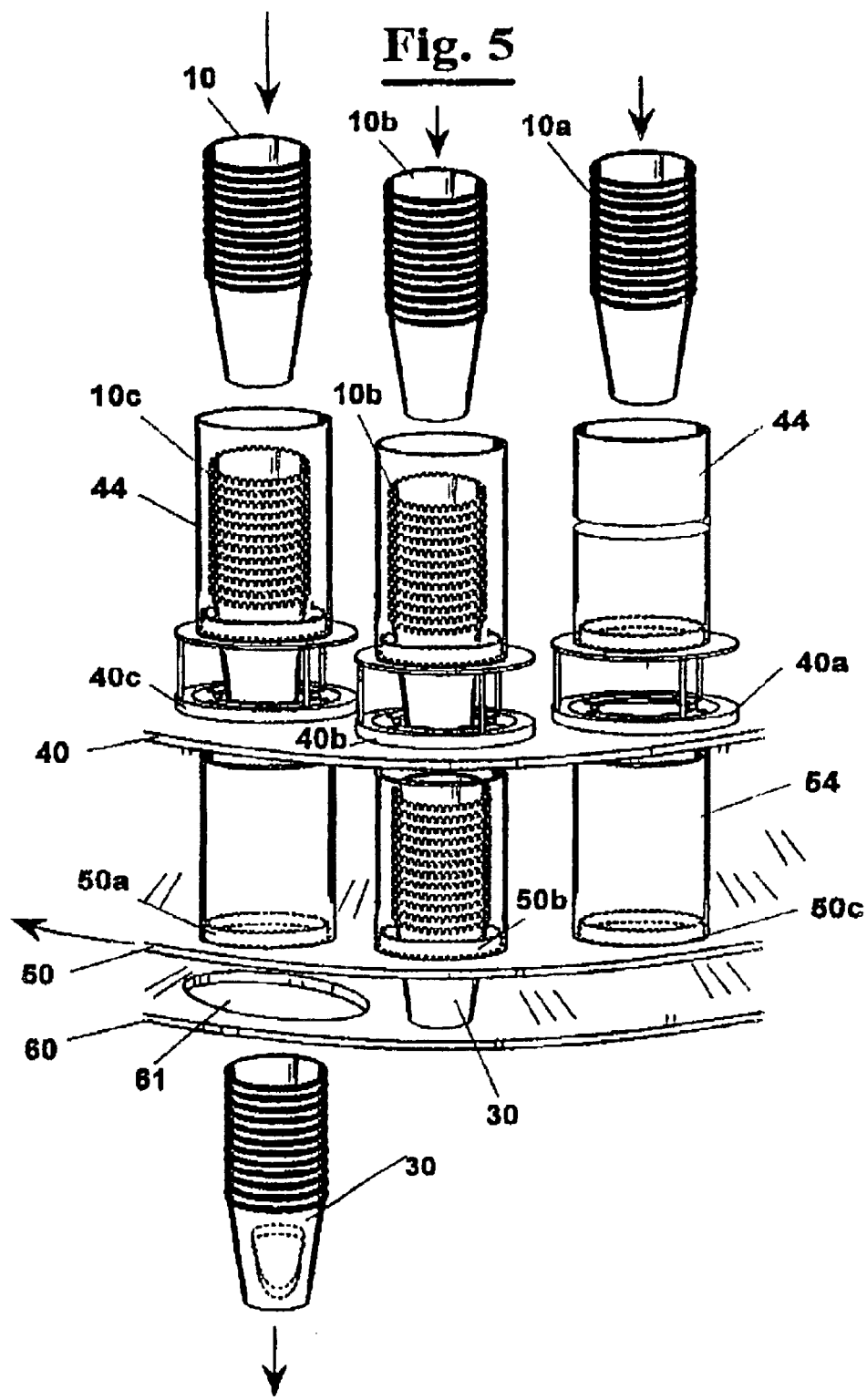
FIG. 5 shows and elevational partial view of a second embodiment of a stacking apparatus that carries out the method according to the invention with a circular structure.

With reference to FIG. 5, feeders $40a$, $40b$, $40c$ can be arranged along a circular path on first circular platform 40. To each feeder, a releasing device 45 (see FIG. 10) is associated. Tubes 44 protect the stacked objects $10a$, $10b$, $10c$.

Below first circular platform 40 is second circular platform 50, with housings $50a$, $50b$, and $50c$, each of which is provided with tubes 54 protect output stacks 30. Platforms 40 and 50 are parallel to each other and the latter can rotate with respect to the former. Third platform 60 is parallel to first platform 40 and second platform 50. Third platform 60 has hole 61 through which output stacks of objects 30 can be released. The rotation of second platform 50 in turn brings housings 50a, 50b, 50c to align under feeders 40a, 40b, 40c of platform 40.

Figure 6:
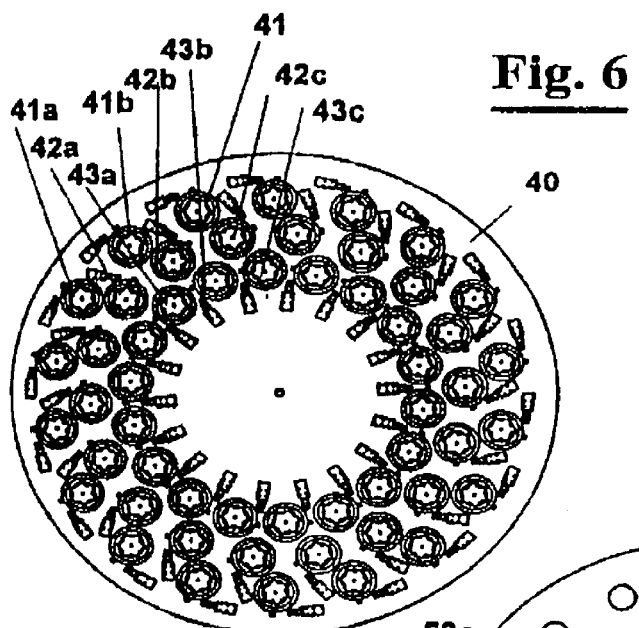
FIGS. 6, 7, and 8 show a top plan view of a first, a second, and a third circular platform, respectively, of the apparatus of FIG. 5.
Figure 7:
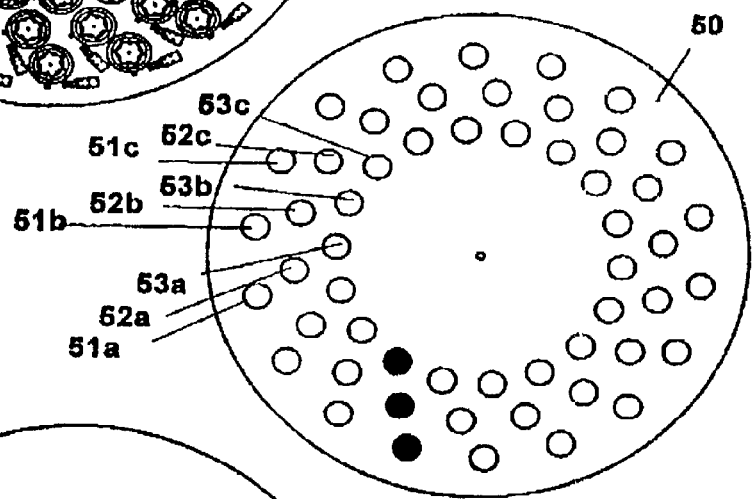
Figure 8:
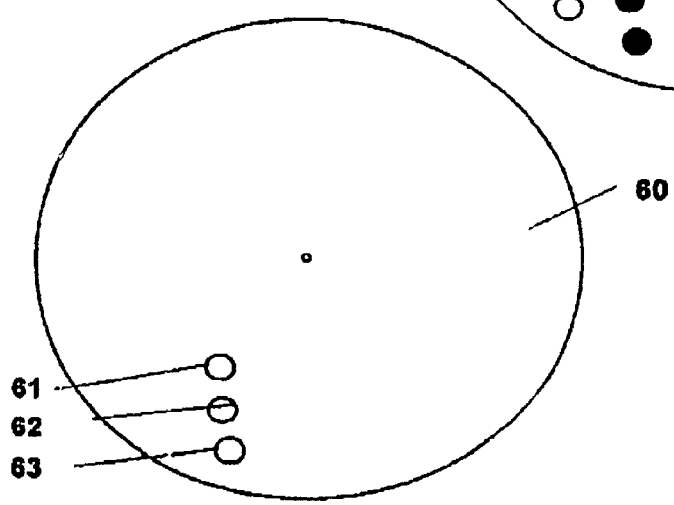

With reference to FIGS. 6 and 7, to increase the production rate without increasing the diameter of platforms 40, 50, 60, three groups of feeders 41a, 41b, and 41c, 42a, 42b, and 42c, and 43a, 43b, and 43c are arranged along three circular lines on first circular platform 40 are provided. Releasing device 45 is associated to each feeder 41a, 41b, and 41c.

Below first circular platform 40 and on second circular platform 50, housing 51a, 51b, and 51c, 52a, 52b, and 52c, 53a, 53b, and 53c are provided. Housings 51a, 51b, and 51c, 52a, 52b, and 52c, and 53a, 53b, and 53c are also arranged along three circular lines on platform 50.

Also, platforms 40 and 50 are parallel to one another and the later is movable with respect to the former. Third platform 60 has holes 61, 62 63 through which output stacks 31, 32, 33 of objects can fall (see also FIG. 9).

Figure 10:
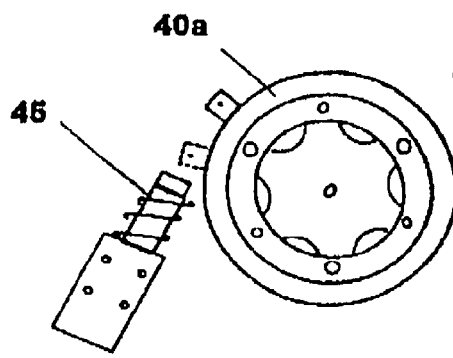
FIG. 10 shows a top plan view of a releasing device of the apparatus of FIG. 5.

Feeders 411, 41b, and 41c, 42a, 42b, and 42c, and 43a, 43b, and 43c are all arranged on first platform 40, angularly distanced, and second platform 50 has housings 51a, 51b, and 51c, 52a, 52b, and 52c, and 53a, 53b, and 53c, each angularly spaced as in first platform 40. Second platform 50 can rotate stepwise with respect to first platform 40 through drive means (riot shown). At each step, releasing devices 45 (as shown in FIG. 10) releases the objects from the feeding means in the housings present under it.

Alternatively, second platform 50 has a continuous motion and releasing devices 45 are associated with sensing means (not shown) that detect the correspondence of the feeders 41a and the housing 51a, so that releasing devices 45 release objects 10a, 10b, and 10c responsive to the sensing means.

Figure 9:
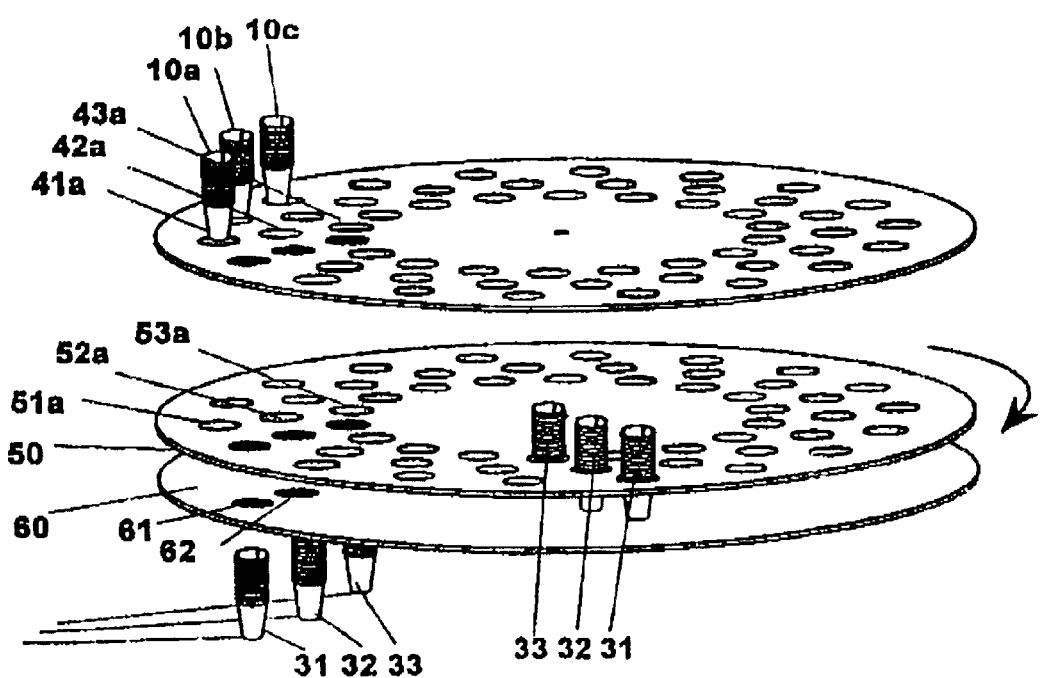
FIG. 9 shows a partial perspective view of an apparatus similar to that shown in FIG. 5.

With reference to FIG. 9, the output stacks 31, 32, 33 pass through third platform 60 on slides (not shown) that end on a common slide (not shown). In this manner, a final output stack can be formed by combining partial output stacks 31, 32, 33.

The embodiments of FIGS. 5–9 relate to a very compact apparatus for carrying out the invention which requires minimal assistance by an operator and has a high production rate.

The foregoing description of a specific embodiment will so fully reveal the invention according to the conceptual point of view, so that other, by applying current knowledge, will be able to modify and/or adapt for various application such an embodiment without further research and without parting from the invention, and it is therefore to be understood that such adaptations and modifications will have to be considered as equivalent to the specific embodiment. The means and the materials to realize the different functions described herein could have a different nature without, for this reason, departing from the field of the invention. It is to be understood that the phraseology or terminology employed herein is for the purpose of description and not of limitation.

What is claimed is:

1. A method for packaging a plurality of party articles, each of said plurality of particles having one or more identifying indicia, each of said one or more identifying indicia being different from one another, comprising the steps of:

in a first plurality of equal objects, printing or applying a first of said one or more identifying indicia on each of said first plurality of objects;

repeating said printing or applying step for other pluralities of equal objects, each of said other pluralities of equal objects having another of said one of more identifying indicia;

creating a stacked group comprised of one of each of said pluralities of objects, each object of said plurality of stacked objects being picked up one at a time from each plurality of equal objects, whereby said stacked group comprises only one of each plurality of equal objects; and packaging said stacked group to obtain a package.

2. The method according to claim 1, wherein said method is further comprised of the steps of:

stacking said pluralities of objects with said one or more identifying indicia disposed thereon in different feeding means;

creating said stacked group by passing said stacked group under said feeding means; and packaging a plurality of stacked groups into a unit.

3. An apparatus for making a package of objects, each of said plurality of objects having a different one or more identifying indicia, comprising:

a plurality of feeding means arranged along a line or a curve, on each of which an input stack of one or more of said plurality of objects is present;

at least one support associated with said plurality of feeding means, wherein each of said at least one supports is and movable relative to said plurality of feeding means, each of said at least one support having at least one housing suitable for receiving in turn said objects from said feeding means; and means for selectively transferring one of each of said plurality of objects at a time from each of said plurality of feeding means to an output stack of mixed objects formed within one of said at least one housing, whereby each output stack is formed by objects coming from different feeding means.

4. The apparatus according to claim 3, wherein said plurality of feeding means are arranged in a first circular line on a first platform, one of said at least one support being arranged on a second platform provided coaxially under said first platform and having said plurality of housings arranged on a second circular line under said plurality of feeding means, wherein motion between said second platform is relative to said first platform and in succession, each of said plurality of feeding means and one of said at least on housing, and wherein means for releasing selectively one of said plurality of objects at a time on to an output stack that is formed in one of said at least one housing at the passage under one of said plurality of said feeding means, means being provided for removing said output stack from said at least one housing after passage under a predetermined number of said plurality of feeding means.

5. The apparatus according to claim 3, wherein said feeding means is arranged in a line, said at least one support being a conveyor arranged under said line.

6. The apparatus according to claim 4 or 5, wherein each of said plurality of feeding means is arranged according to a plurality of concentric or parallel lines, whereby a plurality of partial output stacks are formed on each of said plurality of concentric or parallel lines, and means are provided for combining said partial output stacks, so that a single final stack is formed with one of said plurality of objects.

7. The apparatus according to claim 4, wherein each of said plurality of feeding means arranged on said first circular line on said first platform are spaced angularly, and said plurality of housings on said second platform each having a housing angularly spaced like said first platform, means being provided for rotating stepwise said second platform with respect to said first platform, and at each step, said means for releasing one of said plurality of objects from said at least one feeding means in said housing present under said means for releasing one of said plurality of objects.

8. The apparatus according to claim 4 or 5, wherein said means for releasing selectively one of said plurality of objects is associated to sensing means that detect the correspondence of said plurality of feeding means and said at least one housing, said means for releasing one of said plurality of objects being responsive to said sensing means.

9. The apparatus according to claim 4, wherein discharge means are provided of said output stacks comprising a third platform below said second platform, said second platform having each of said plurality of housings further comprised of an opening at said lower end of each of said plurality of housings so that said output stack rests and slides on said third platform, at least one hole being provided for said first circular line and said second circular line, whereby said output stack in turn passes through said opening and falls through it on to withdrawing means.

10. The method according to claim 1, wherein said disposable articles for parties are selected from a group comprised of paper cups, plates, cutlery, and napkins.

11. The method according to claim 1, wherein said identifying indicia are selected from a group comprised of a graphical element and a figurative element.

12. The apparatus according to claim 3, wherein each of said plurality of party objects is a disposable party article selected from a group comprised of paper cups, plates, cutlery, and napkins.

13. The apparatus of claim 3, wherein said identifying indicia are selected from a group comprised of a graphical element and a figurative element.

* * * * *